(12) United States Patent
Zeng et al.

(10) Patent No.: US 9,343,720 B2
(45) Date of Patent: May 17, 2016

(54) PRE-TREATING SEPARATOR TO ENABLE SEPARATOR FOR PICK AND PLACE OPERATION

(71) Applicant: Apple Inc., Cupertino, CA (US)

(72) Inventors: Qingcheng Zeng, San Jose, CA (US); Shouwei Hao, Gilroy, CA (US); Brian Shiu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/452,362

(22) Filed: Aug. 5, 2014

(65) Prior Publication Data
US 2016/0043369 A1 Feb. 11, 2016

Related U.S. Application Data

(63) Continuation of application No. PCT/US2014/049768, filed on Aug. 5, 2014.

(51) Int. Cl.
*H01M 2/14* (2006.01)

(52) U.S. Cl.
CPC .......... *H01M 2/145* (2013.01); *H01M 2220/30* (2013.01)

(58) Field of Classification Search
None
See application file for complete search history.

(56) References Cited

U.S. PATENT DOCUMENTS

| | | |
|---|---|---|
| 3,917,772 A | 11/1975 | Hollenbeck |
| 8,257,857 B2 | 9/2012 | Lee et al. |
| 8,551,642 B2 | 10/2013 | Morgan et al. |
| 2002/0001746 A1 | 1/2002 | Jenson |
| 2002/0007552 A1 | 1/2002 | Singleton et al. |
| 2012/0153901 A1 | 6/2012 | Hermann et al. |
| 2013/0160283 A1 | 6/2013 | Wu |
| 2014/0023932 A1 | 1/2014 | Zhang et al. |

FOREIGN PATENT DOCUMENTS

| | | |
|---|---|---|
| JP | 11-102696 | 4/1999 |
| JP | 2012-166254 | 9/2012 |

OTHER PUBLICATIONS

PCT/US2014/049768 International Search Report & Written Opinion dated Apr. 24, 2015.

*Primary Examiner* — Yoshitoshi Takeuchi
(74) *Attorney, Agent, or Firm* — Downey Brand LLP

(57) ABSTRACT

The described embodiments relate to methods and apparatus for improving pick and place operations. Pick and place operations involving the movement of flexible substrates can be improved by cooling a flexible substrate below a threshold temperature at which the flexible substrate transitions from a flexible state to a rigid state. Once in the rigid state, the flexible substrate can be handled and maneuvered by pick and place operations for a period of time with a limited risk of the flexible substrate wrinkling and tearing. In some embodiments, the flexible substrate is a thin polymeric substrate used to separate oppositely charged battery cells within a battery assembly.

20 Claims, 10 Drawing Sheets

B-B

PRE-TREATING SEPARATOR TO ENABLE SEPARATOR FOR PICK AND PLACE OPERATION

CROSS REFERENCE TO RELATED APPLICATIONS

This application is a continuation of International Application No. PCT/US14/49768 with an international filing date of Aug. 5, 2014, entitled "PRE-TREATING SEPARATOR TO ENABLE SEPARATOR FOR PICK AND PLACE OPERATION," which is incorporated herein by reference in its entirety for all purposes.

FIELD

The described embodiments relate generally to methods for improving pick and place operations in which a flexible substrate is moved. More particularly, the present embodiments relate to methods and apparatus for stiffening a thin polymeric substrate by cooling it below a threshold temperature at which the thin polymeric substrate becomes rigid enough to be moved by a pick and place machine.

BACKGROUND

As the demand for portable electronic devices increases, so does the demand for batteries. In order to meet the growing demand for batteries, more efficient methods for manufacturing batteries are desired. Assembly operations often utilize pick and place machines for assembly of various components. Unfortunately, when battery assembly operations include movement of components that have a tendency to bend and flex at room temperature, the bending and flexing of the components can prevent a pick and place machine from accurately transporting those components. For example, pick and place machines have a tendency to substantially wrinkle and/or bend components formed from flexible substrates that are often incorporated into a battery. Consequently, manufacturers of batteries are restricted to less efficient means of manipulating these types of battery components.

SUMMARY

This paper describes various embodiments that relate to cooling a thin polymeric substrate and assembling a battery.

A method for assembling a battery is disclosed. The method includes at least the following steps: cooling a thin polymeric substrate below a threshold temperature so that the thin polymeric substrate transitions from a flexible state to a rigid state during the cooling and maintains the rigid state for at least a first period of time; cutting the thin polymeric substrate to a set of desired dimensions; translating the thin polymeric substrate to a location above a first battery cell using a pick and place machine; and placing the thin polymeric substrate atop the first battery cell using the pick and place machine. The cutting, translation, and placing are all completed during the first period of time.

A method is disclosed. The method includes at least the following steps: cooling a substrate below a transition temperature at which the substrate transitions from a flexible state to a rigid state, and translating the substrate from a first position to a second position using a computer actuated arm. By cooling the substrate below the transition temperature the substrate maintains the rigid state during the translation, thereby preventing inadvertent flexing and bending of the substrate during the translation.

A method of assembling a battery is disclosed. The method includes at least the following steps: cooling a thermoplastic film below a temperature at which a stiffness of the thermoplastic film inhibits a first portion of the film from deforming with respect to a second portion of the thermoplastic film for a first period of time, such that the second portion of the film is prevented from inadvertently flexing and bending with respect to the first portion during subsequent operations; cutting the thermoplastic film to a set of dimensions; and translating the thermoplastic film from a first position to a second position. The cutting and translating of the thermoplastic film are both completed during the first period of time.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
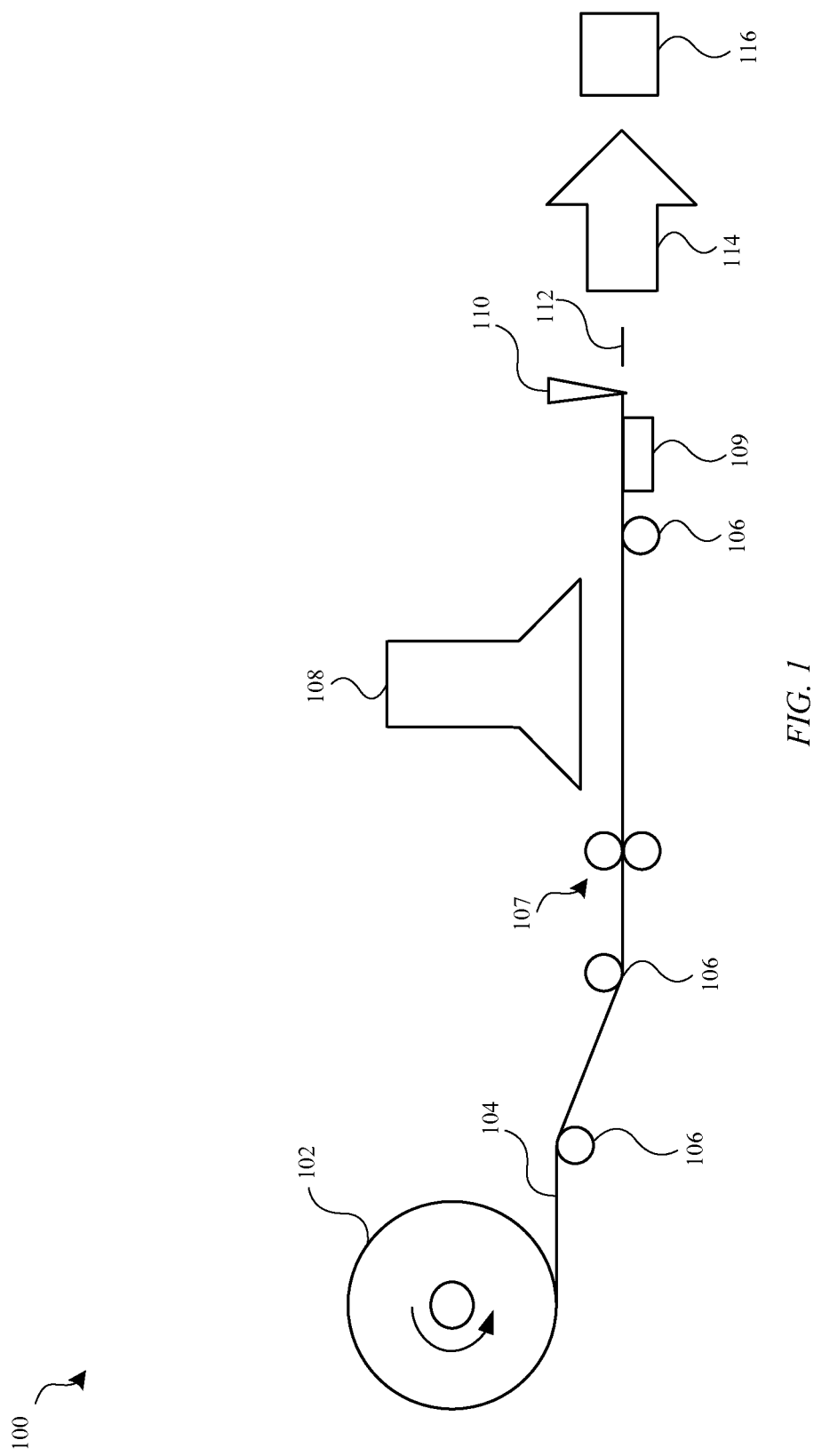
FIG. 1 shows how a pick and place operation can be utilized to assemble a battery.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Pick and place machines utilize robotic arms to carry out specific programmed steps or procedures which can be repeated with high accuracy and precision. Typically, the pre-programmed steps are based on a coordinate system which allows for a highly repeatable process to be performed. In addition, pick and place machines are used extensively to place electrical components on circuit boards because the pick and place machine allows for a continuous, highly reliable operation without the need of human intervention. Moreover, pick and place machines can be customized to suit a wide range of tasks. For example, a pick and place machine can be configured with a customized suction head, optimized for handling particularly sized rigid objects coming off a production line.

Unfortunately, a pick and place machine suffers from substantial limitations when handling a flexible object such as a thin polymeric substrate. One limitation is that the translational speed of the pick and place machine may need to be reduced to prevent flexing, bending or wrinkling of the thin polymeric substrate during a pick and place operation. Flexing, bending and wrinkling of the thin polymeric substrate are each adverse to precision pick and place operations because the coordinates associated with a position of the thin polymeric substrate become uncertain or even unknowable. This prevents the pick and place machine from being able to place the thin polymeric substrate in a precise manner.

Other limitations associated with conventional pick and place operations include the tendency of a central portion of the thin polymeric substrate to be drawn within one or more of the suction heads, thereby wrinkling and/or bending the thin polymeric substrate. This deformation caused by the aforementioned wrinkling or bending becomes problematic when thin polymeric substrates are incorporated into a stack because a deformed layer of a flexible material can prevent alignment of the stack, and in some cases prevent other layers of the stack from lying flat. These limitations may be remedied by customizing the tooling of the pick and place machine to avoid or mitigate these problems; however, customizing a pick and place machine for handling a thin polymeric substrate can become costly for a manufacturing operation. In addition to costs associated with customizing the tooling, the flexible nature of the thin polymeric substrate can still substantially slow movement of the thin polymeric substrate resulting in manufacturing delays, and increased cycle time necessary to account for slower pick and place operations. These factors can make such an endeavor undesirable.

One solution to the aforementioned problems is to cool the thin polymeric substrate prior to conducting a pick and place operation. By cooling the thin polymeric substrate, the thin polymeric substrate can be transitioned from a flexible state to a rigid state. The thin polymeric substrate becomes rigid during the cooling because relative motion between groups of nearby monomer chains within the thin polymeric substrate is reduced. Consequently, the inability of nearby monomer chains to move within the thin polymeric substrate substantially reduces the tendency of the thin polymeric substrate to deform. Once a transition temperature is reached, sometimes referred to as a glass transition temperature, the thin polymeric substrate can achieve a level of rigidity where little if any wrinkling, bending or flexing occurs. By cooling the thin polymeric substrate to a temperature far enough below the transition temperature, referred to in this application as a threshold temperature, the thin polymeric substrate can maintain a temperature below the transition temperature for a period of time. In this way, subsequent operations can be performed upon the thin polymeric substrate during the period of time without having to customize an operation that would ordinarily result in wrinkling, bending or flexible of the thin polymeric substrate. Consequently, a pick and place machine can be utilized to quickly lift or transport the thin polymeric substrate with limited risk of wrinkling, bending or flexing.

Cooling the thin polymeric substrate can have additional benefits. A cutting process is more likely to yield a straight line cut at a point of contact when monomer chains within the thin polymeric substrate are unable to move or deform. For example, when a blade comes into contact with the thin polymeric substrate, stretching and deforming of an individual monomer is inhibited so that the thin polymeric substrate fractures at the point of contact. In this way, the increased accuracy of the cutting process yields a higher dimensional accuracy of a final part. It should be noted that a crystalline structure within the thin polymeric substrate remains unaffected during a cooling process because there is not sufficient molecular mobility to allow the monomer chains to rearrange into a close packaging configuration. Consequently, a thin polymeric substrate chosen for a particular application based on its particular crystalline structure will not be adversely affected by the cooling process.

In one specific embodiment, the aforementioned processes can be utilized during a battery assembly operation. A battery can contain a number of positively and negatively charged battery cells separated by a number of interspersed thin polymeric substrates, known as separators. The purpose of the separators is to limit ionic flow to a single flow direction between the oppositely charged battery cells. The aforementioned process can be utilized to intersperse separators between battery cells. This process begins at a first step where a separator can be flattened using a series of rollers or other flattening processes. Second, a cooling process is used to set a desired geometry and rigidity of the separator by cooling the separator below a threshold temperature. In some embodiments, the separator can be cooled by conveying the separator through a cooling apparatus, such as a liquid nitrogen bath or spray. Next, the cooled separator can be cut to a desired dimension to fit within the battery. Subsequently, a pick and place machine can be utilized to transfer the cooled separator to the battery. In some embodiments, a fixturing device or mechanical guides can be utilized to facilitate proper placement of the separator in accordance with at least one edge of the battery and to maintain a position of the separator after the separator returns to a flexible state. Proper alignment of the separator between the oppositely charged battery cells prevents the ionic flow from bypassing the separator and flowing opposite the desired flow direction. The aforementioned process should be completed prior to the separator returning to the flexible state. It should be noted that the aforementioned process can be incorporated into a production line operation.

In addition, the separator can take many forms. For instance, the separator can be a thin polymeric substrate coated with a ceramic to increase thermal resistance and dimensional stability of the separator. Increasing thermal resistance and dimensional stability of the separator helps the separator maintain the same size and shape during high temperature operations of the battery cell so that the separator can maintain its function of limiting ionic flow to the desired flow direction.

These and other embodiments are discussed below with reference to FIGS. 1-9; however, those skilled in the art will readily appreciate that the detailed description given herein with respect to these figures is for explanatory purposes only and should not be construed as limiting.

FIG. 1 shows an overview of battery assembly operation 100 during which a number of separators 112 are fabricated and then subsequently interspersed between battery cells of battery 116. As shown, battery assembly operation 100 involves a number of steps. First, spooling apparatus 102 unwinds to release an amount of separator material 104. In some embodiments, separator material 104 can be a thermoplastic film such as a polyethylene film or a polypropylene film. In some embodiments, a width of separator material 104 can be substantially the same as a desired final dimension of separator 112. Alternatively, in some embodiments separator material 104 may be oversized relative to the desired final dimensions of separator 112.

As separator material 104 is unwound from spooling apparatus 102 rollers 106 can be utilized to convey, and in some embodiments maintain a uniform tension on separator material 104 during an initial portion of battery assembly operation 100. Moreover, puller apparatus 109 can work in tandem with rollers 106 to help convey separator material 104 during the initial portion of battery assembly operation 100. In addition, rollers 106 reduce the ability of separator material 104 to wrinkle or deform during conveyance in the initial portion of battery assembly operation 100. This is accomplished by coordinating a rotational speed of rollers 106 to maintain the uniform tension on separator material 104. In this way, a planar shape of separator material 104 can be maintained during the initial portion of battery assembly operation 100. In some embodiments, separator material 104 can be flattened while it is being conveyed to the cooling apparatus. For example, separator material 104 can be flattened by conveying it between flattening rollers 107. When two flattening rollers 107 are positioned parallel to and adjacent one another, flattening rollers 107 can be separated by a short distance that corresponds to the thickness of separator material 104. When the distance is about the same as or less than the thickness of separator material 104, conveying separator material 104 between the adjacent flattening rollers 107 can facilitate the removal of any minor wrinkles or bends in separator material 104. In some embodiments, the gap between flattening rollers 107 can be substantially smaller than a thickness of separator material 104 so that as separator material 104 is flattened, separator material 104 is also thinned to achieve a desired thickness. In some embodiments, rollers 106 can have a non-planar geometry that fashions separator material 104 into a non-planar shape. The non-planar geometry of rollers 106 can impart a specific geometry to separator material 104 prior to separator material 104 undergoing a cooling operation.

As shown, rollers 106 convey separator material 104 through cooling apparatus 108. Cooling apparatus 108 cools separator material 104 below a transition temperature causing separator material 104 to transition from a flexible state to a rigid state. The transition temperature for a thermoplastic corresponds to a temperature at which the thermoplastic undergoes a thermal transition resulting in relative motion between nearby monomers being inhibited; this thermal transition temperature is known as the glass transition temperature of the thermoplastic. Accordingly, cooling separator material 104 below the glass transition temperature transitions separator material 104 from a leathery flexible state into a glassy rigid state, thereby reducing the risk of separator material 104 wrinkling or bending. Consequently, cooling separator material 104 below the glass transition temperature increases the ability of a pick and place machine to handle and accurately place separator material 104 within battery 116, such that separator material 104 is inhibited from wrinkling and bending.

An amount of time required to cool separator material 104 below the transition temperature can depend on at least the following factors: material characteristics of separator material 104, and properties of a cooling agent utilized in cooling apparatus 108. It should be noted that while bringing separator material 104 below the transition temperature does change the rigidity of separator material 104 in the desired manner, separator material 104 should generally be cooled far enough below the transition temperature to prevent separator material 104 from returning to a temperature above the transition temperature before a handling operation is completed. For this reason, the temperature of separator material 104 should be brought below a threshold temperature (substantially lower than the transition temperature) that allows separator material 104 to maintain the rigid state for at least a period of time necessary to complete subsequent operations. This period of time will generally be referred to as a fabrication time. The subsequent operations can include cutting separator material 104 into individual separators 112, and translating and aligning separators 112 within battery 116 using a pick and place machine. In some embodiments, cooling separator material 104 below the threshold temperature causes separator material 104 to maintain the rigid state for at least thirty seconds.

As shown, rollers 106 convey separator material 104 to cutting apparatus 110. Cutting apparatus 110 can be utilized to cut separator material 104 into a number of discrete separators 112. Depending on a shape of battery 116, a number of cutting apparatus 110 can be utilized to cut separator material 104 to substantially correspond to the dimensions of battery 116. For example, a single blade cutter can be utilized to cut separator material 104. Moreover, a cutting operation should be carried out during the fabrication time such that separator material 104 is more likely to yield a straight line cut when monomer chains within separator material 104 are unable to move or deform. In this way, separator 112 can achieve substantially greater dimensional accuracy resulting from the inability of separator material 104 to stretch or deform during the cutting operation. Consequently, by cutting separator material 104 during the fabrication time a cutting operation is more likely to yield separator 112 with a desired set of dimensions.

As shown, subsequent to cutting operation, a pick and place machine can be utilized to perform pick and place operation 114. Pick and place operation 114 can be utilized to intersperse separator 112 within battery 116. For example, the pick and place machine can place and align separator 112 on a top surface of a first battery cell. It should be noted that pick and place operation 114 should be carried out during the fabrication time to prevent separator 112 returning to a flexible state prior to completing the alignment of separator 112 within battery 116. In some embodiments, pick and place operation 114 utilizes a suction head to grip separator 112. Because separator 112 is maintained in a rigid state, the suction head can accurately and repeatedly place separator 112 within battery 116, while limiting a risk of separator 112 wrinkling or tearing. In this way, a quality and accuracy of battery 116 can be improved and maintained during battery assembly operation 100.

Figure 2A:
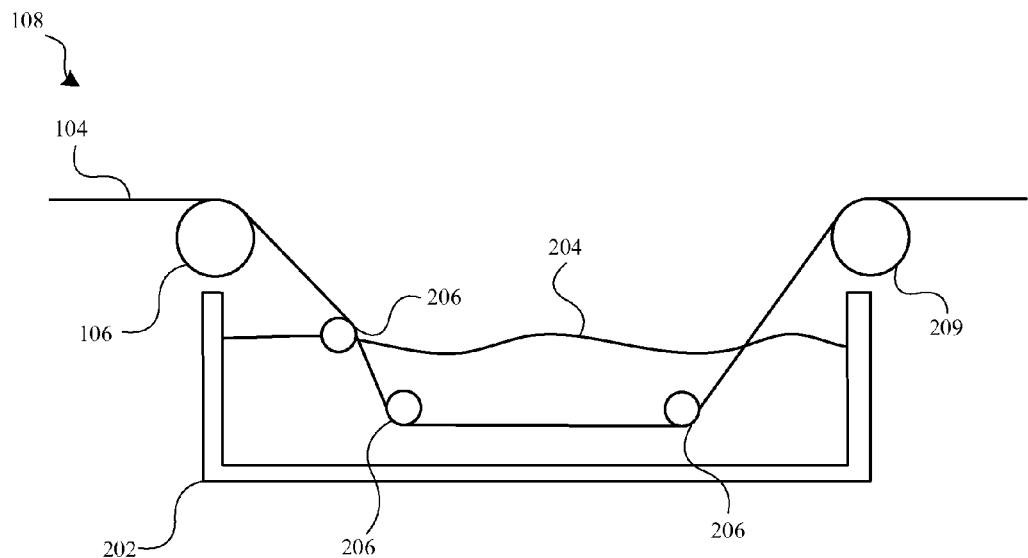
FIGS. 2A-2E show various cooling apparatuses that can be utilized to cool separator material below a threshold temperature.

FIG. 2A shows a specific configuration for cooling apparatus 108 that includes cooling bath 202. Cooling bath 202 can be utilized to cool separator material 104 below a transition temperature causing separator material 104 to transition from a flexible state to a rigid state. Moreover, cooling bath 202 can utilize cooling agent 204 that is capable of cooling separator material 104 below a threshold temperature. In some embodiments, this is accomplished by submerging separator material 104 in cooling agent 204. For example, cooling agent 204 taking the form of liquid nitrogen can utilize the aforementioned technique to cool separator material 104 below the threshold temperature. In some embodiments, cooling agent 204 can take the form of dry ice. In some embodiments, cooling apparatus 108 can utilize a processor to regulate a temperature of cooling agent 204. For example, the processor can be utilized to control cooling apparatus 108 in accordance with inputs or parameters supplied to the processor. Some inputs can include a temperature of separator material 104 and separator 112 during various stages of battery assembly operation 100. Other inputs can include a current temperature of cooling agent 204. Still other inputs can include an amount of time a particular assembly line is taking to position separator 112 within battery 116. In some embodiments, the processor can be configured to vary a rate at which separator material 104 is conveyed through cooling apparatus 108. In these ways, cooling apparatus 108 can manipulate the temperature of separator material 104 as separator material 104 leaves cooling apparatus 108 to suit any number of potential operational or environmental changes. Moreover, cooling separator material 104 below the threshold temperature enables a pick and place machine to handle separator 112 with a limited risk of separator 112 wrinkling or tearing. It should be noted that although a pick and place machine can be utilized to handle separator 112; other techniques and apparatus can be utilized to handle separator 112 during the fabrication time. In some embodiments, the pick and place machine can take the form of a computer actuated arm that can perform the same functions described above. For example, the computer actuated arm can be utilized to handle separator 112.

Rollers 106 and cooling apparatus rollers 206 can coordinate to maintain a uniform amount of tension on separator material 104 as separator material 104 passes through cooling apparatus 108. In some embodiments, a control system can be utilized to coordinate a rotational speed of rollers 106 and cooling apparatus rollers 206, thereby maintaining the uniform tension during an initial portion of battery assembly operation 100. In some embodiments, cooling apparatus rollers 206 can be designed to shape separator material 104 to a desired geometry prior to entering cooling bath 202. This shaping operation can be particularly useful when battery 116 has a non-planar geometry. In some embodiments, cooling roller 209 can be positioned after cooling apparatus 108 to mitigate warming of separator material 104 during a remaining portion of battery assembly operation 100.

Figure 2B:
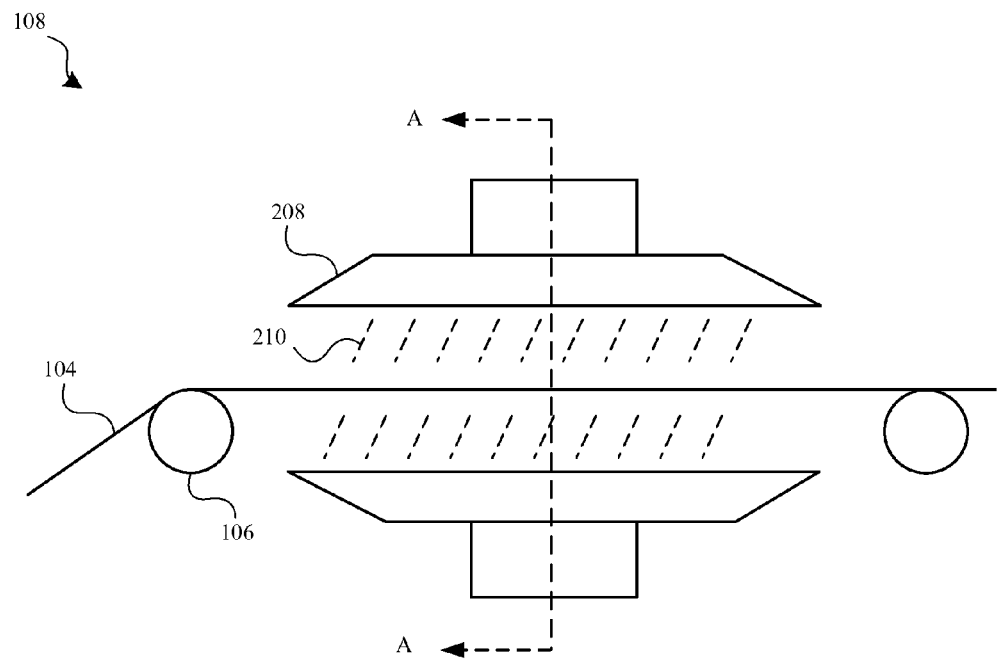

FIG. 2B shows a specific configuration for cooling apparatus 108 that includes cooling sprayer 208. In some embodiments, cooling sprayer 208 can utilize liquid nitrogen as coolant 210 to cool separator material 104 below the threshold temperature. In addition, cooling sprayer 208 can utilize rollers 106 to maintain a uniform tension on separator material 104 as discussed above. As shown in FIG. 2B, cooling sprayer 208 is oriented so that coolant 210 is directed downward onto a top surface of separator material 104, while an additional series of nozzles is oriented to spray coolant 210 upward onto a bottom side of separator material 104. In this way, substantially all surfaces of separator material 104 can be contacted by coolant 210, thereby increasing an efficiency at which separator material 104 is cooled. Furthermore, in some embodiments, cooling sprayer 208 can include a nozzle or nozzles having various spraying configurations that facilitate uniform cooling of separator material 104 below the threshold temperature during conveyance through cooling sprayer 208. In some embodiments, cooling sprayer 208 can utilize a number of staggered nozzles positioned throughout the length of cooling sprayer 208 to substantially cover separator material 104 with coolant 210. In this way, an arrangement and/or configuration of the nozzles can reduce the risk of a specific region of separator material 104 failing to be cooled below the threshold temperature during conveyance through cooling sprayer 208.

Figure 2C:
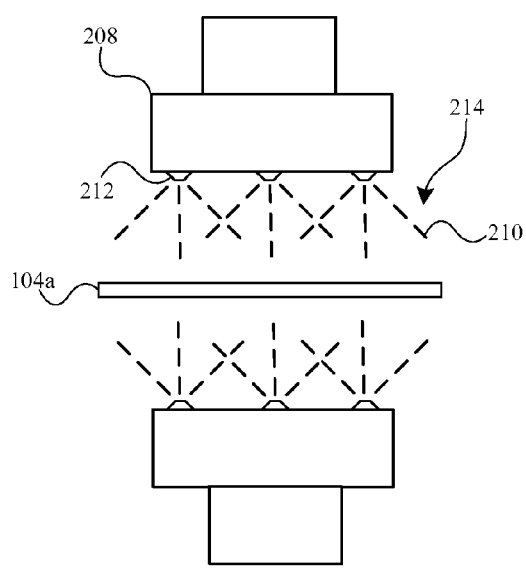
Figure 2D:
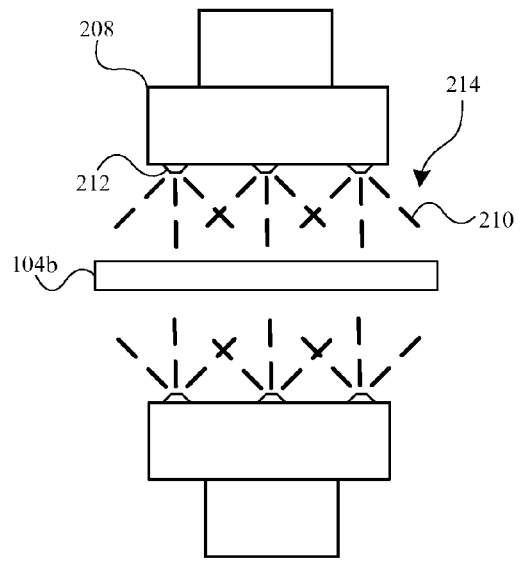
Figure 2E:
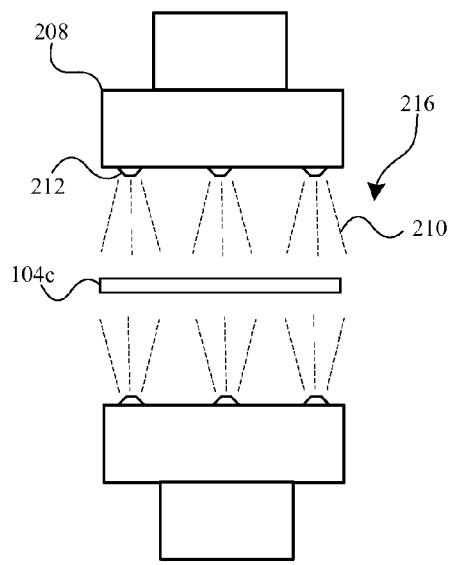

FIGS. 2C-2E show how cooling sprayer 208 can configure spray nozzles 212 to account for a width and thickness of separator material 104. For example, the width of separator material 104 can vary in accordance with a final desired size of separator 112. As shown in FIG. 2C, spray nozzles 212 can be adjusted to emit first spray pattern 214 that substantially covers an entire surface of separator material 104$a$ with coolant 210. In this way, separator material 104$a$ undergoes uniform cooling as it passes through first spray pattern 214. A flow rate associated with first spray pattern 214 can also be adjusted to lower the temperature of separator material 104 to the threshold temperature. FIG. 2D depicts how cooling sprayer 208 can account for separator material 104$b$ having an increased thickness. Cooling sprayer 208 can increase a flow rate of coolant 210 to account for the greater volume of separator material 104$b$, as the greater volume associated with the increased thickness allows separator material 104$b$ to store more internal energy when compared to a thinner material. In this way, the increased flow rate of coolant 210 sprayed onto separator material 104$b$ can be utilized to account for the additional stored internal energy of separator material 104$b$. In this way, cooling sprayer 208 can be adjusted to cool separator material 104$b$ effectively below the threshold temperature.

FIG. 2E shows how cooling sprayer 208 can accommodate a smaller surface area of separator material 104$c$ by adjusting first spray pattern 214 to second spray pattern 216. Second spray pattern 216 can be substantially more concentrated relative to first spray pattern 214. The more concentrated spray pattern increases an amount of coolant 210 delivered to a particular area of separator material 104 without adjusting an overall flow rate of coolant 210 from spray nozzles 212. As a result of the narrowed spray pattern, a flow rate of coolant 210 can be reduced as there is less material overall to account for relative to an amount of coolant 210 required to cool the wider separator material 104$a$. It should be noted that spray nozzles 212 can emit an increased flow rate of coolant 210 to account for other characteristics of separator material 104, such as a material type. For example, separator material 104 made from a polyethylene film may require an increased flow rate of coolant 210 sprayed onto a surface of separator material 104 to effectively cool the polyethylene film below its glass transition temperature. Conversely, the flow rate of coolant 210 can be reduced when separator material 104 is made from a polypropylene film, as polypropylene has a relatively higher glass transition temperature.

Figure 3A:
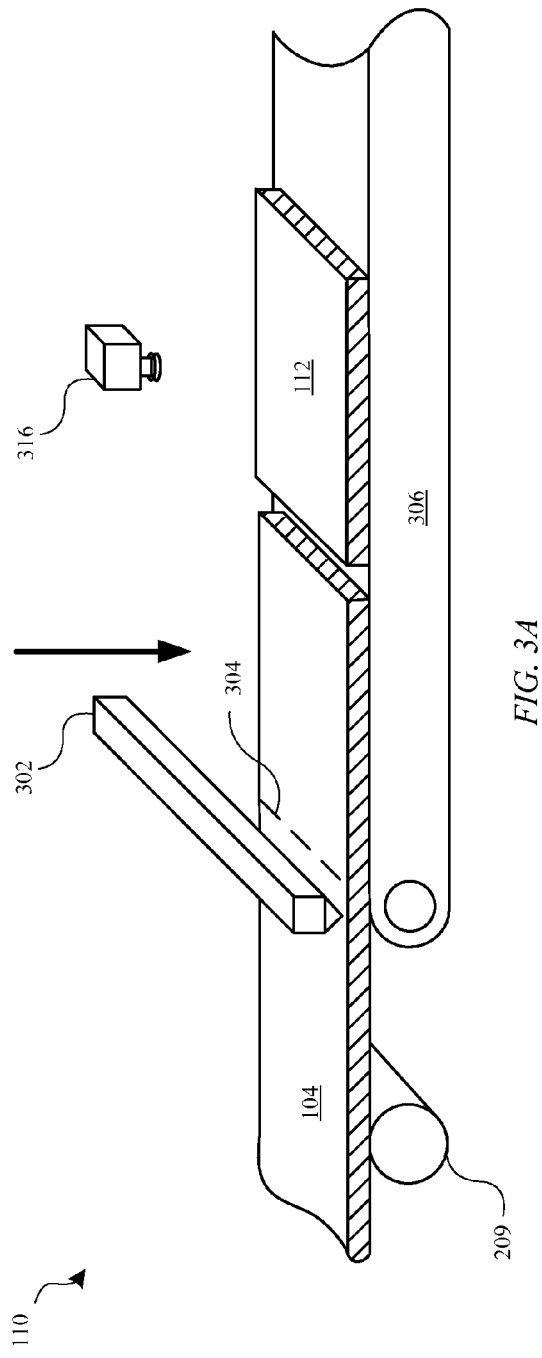
FIGS. 3A-3B show how a cutting apparatus can be utilized to cut separator material into a number of separators having a desired shape.
Figure 3B:
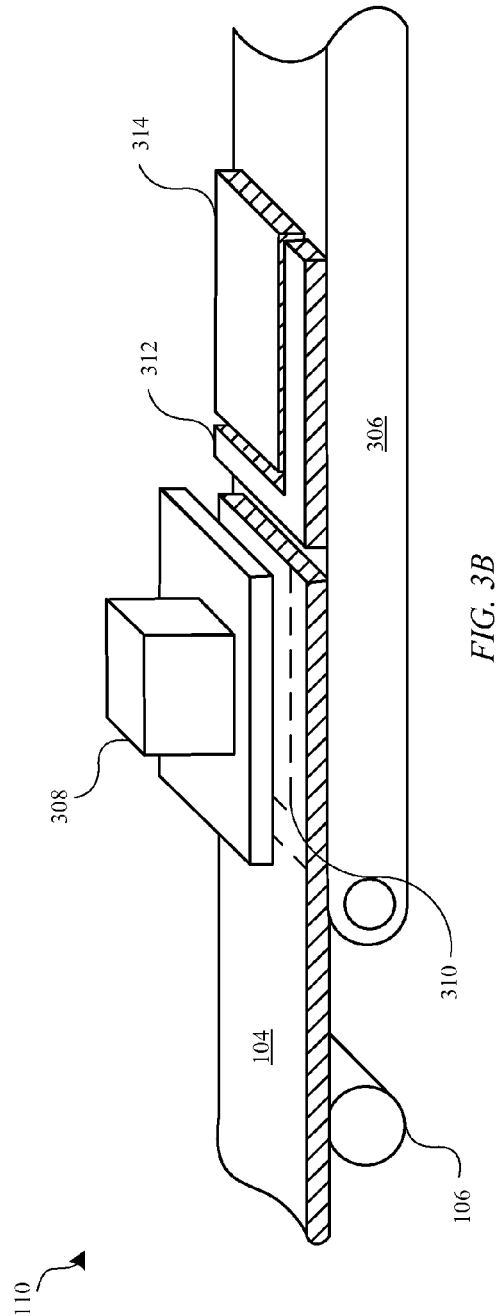

FIGS. 3A-3B show how cutting apparatus 110 can be utilized to cut separator material 104 to a desired shape. As shown in FIG. 3A, separator material 104 can be conveyed to cutting apparatus 110 using rollers 106 and subsequently away from cutting apparatus 110 using a material conveyance apparatus along the lines of conveyor belt 306. Cutting apparatus 110 can utilize various cutting mechanisms; for example, cutting apparatus 110 can utilize single edge cutter 302 to cut separator 112 into a substantially rectangular shape using straight line cut 304. In this way, the shape of separator 112 can substantially correspond to battery 116 having a rectangular shape. In some embodiments, optical sensor 316 can be utilized to track a dimensional accuracy of separator 112 after separator 112 is cut by cutting apparatus 110. In this way, if separator 112 is cut to an improper dimension it can be discarded from battery assembly operation 100.

FIG. 3B shows how cutting apparatus 110 can utilize stamping apparatus 308 to cut separator material 104 at desired cut locations 310. Stamping apparatus 308 can utilize multiple cutting edges to cut separator material 104 to a desired final shape. In this way, stamping apparatus 308 can cut separator material 104 into separator 312 that is non-rectangular in shape. Furthermore, separator 312 having a non-rectangular shape can be interspersed in battery 116 atop a first battery cell with a corresponding non-rectangular shape. Consequently, battery 116 can be utilized in final products where battery 116 is required to be a non-rectangular shape. For example, a lithium ion battery may be a non-rectangular shape in order to fit around internal components, such as in an electronic device. Moreover, stamping apparatus 308 can create secondary separator 314 that can be utilized in another battery 116 having a corresponding geometry. In this way, stamping apparatus 308 can be utilized to fabricate at least two distinct separators during each stamping cycle. In some embodiments, secondary separator 314 can be discarded or recycled.

Figure 4A:
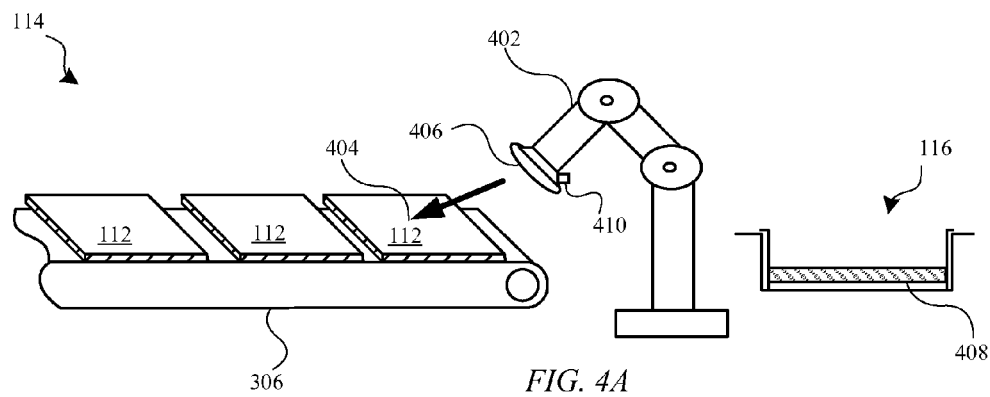
FIGS. 4A-4C show how a pick and place operation can be utilized to translate and align the separators with a battery cell of a battery.
Figure 4B:
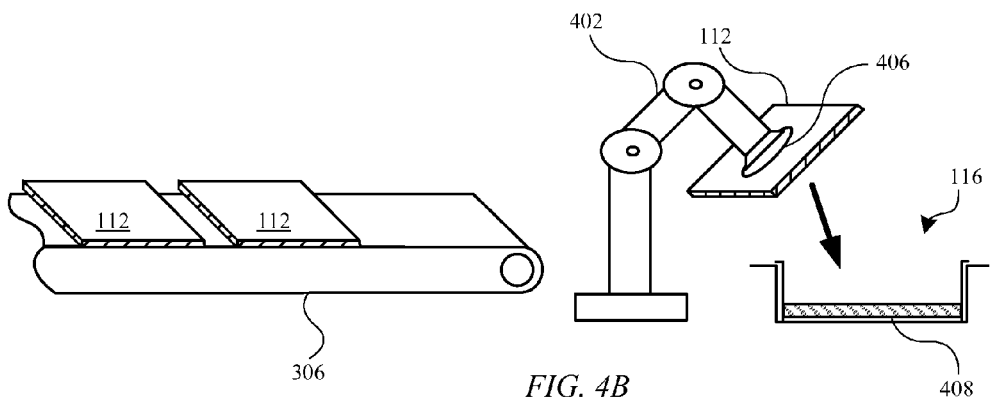
Figure 4C:
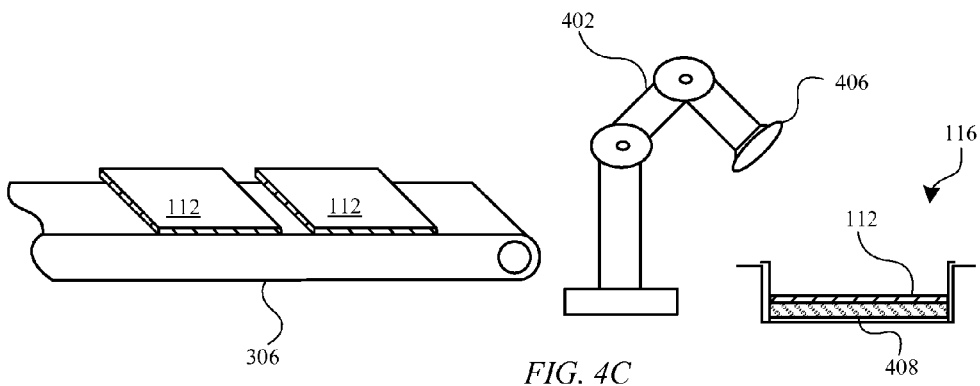

FIGS. 4A-4C depict pick and place operation 114 in which pick and place machine 402 is used to translate and align separator 112 within battery 116. FIG. 4A shows how conveyor belt 306 can position separator 112 at pick-up position 404. Subsequently, pick and place machine 402 can utilize pick and place head 406 to grip separator 112 at pick-up position 404 during each cycle of pick and place machine 402. In this way, pick and place machine 402 can grip each subsequent separator 112 in the same precise location as a previous separator 112. Consequently, pick and place machine 402 can place each subsequent separator 112 in the same precise location within battery 116 as a previous separator 112. FIG. 4B shows pick and place machine 402 translating separator 112 away from pick-up position 404 and aligning separator 112 with a location above battery 116. Subsequently, FIG. 4C shows separator 112 placed atop battery cell 408 within battery 116. In some embodiments, pick and place machine 402 can align each edge of separator 112 with a corresponding edge of battery cell 408 when placing separator 112 atop battery cell 408. It should be noted that although pick and place head 406 can utilize a suction head, pick and place head 406 can utilize other coupling mechanisms. For example, pick and place head 406 can utilize a magnet to couple with separator 112 coated in a ferrous metal. In some embodiments, pick and place head 406 can utilize thermal sensor 410 to track a temperature of separator 112 during pick and place operation 114. Moreover, thermal sensor 410 can signal pick and place machine 402 to discard separator 112 if separator 112 is above a transition temperature.

It should be noted that conveyor belt 306 can be utilized to continuously convey a number of separators 112 during pick and place operation 114. Accordingly, a pick and place cycle rate can correspond to a conveyance rate of conveyor belt 306. The pick and place cycle rate equates to a time it takes for pick and place machine 402 to translate separator 112 from pick-up position 404, subsequently place separator 112 within battery 116, and return to pick-up position 404. In this way, separator 112 can be located at pick-up position 404 each time pick and place machine 402 returns to pick-up position 404, thereby creating a continuous process. In some embodiments, multiple pick and place machines 402 can be utilized to assemble a number of batteries 116. For example, multiple pick and place machines 402 can be positioned parallel to conveyor belt 306 with each individual pick and place machine 402 having a corresponding pick-up position 404 on conveyor belt 306. In this way, multiple pick and place operations 114 can be performed concurrently resulting in a substantially greater number of batteries 116 being assembled compared to using a single pick and place machine 402. Moreover, having a number of pick and place machines 402 performing at substantially the same time reduces a time period between cooling separators 112, and assembling separators 112 into a battery, thereby reducing a risk of pick and place operation 114 failing to be carried out before separator 112 returns to a flexible state.

Figure 5A:
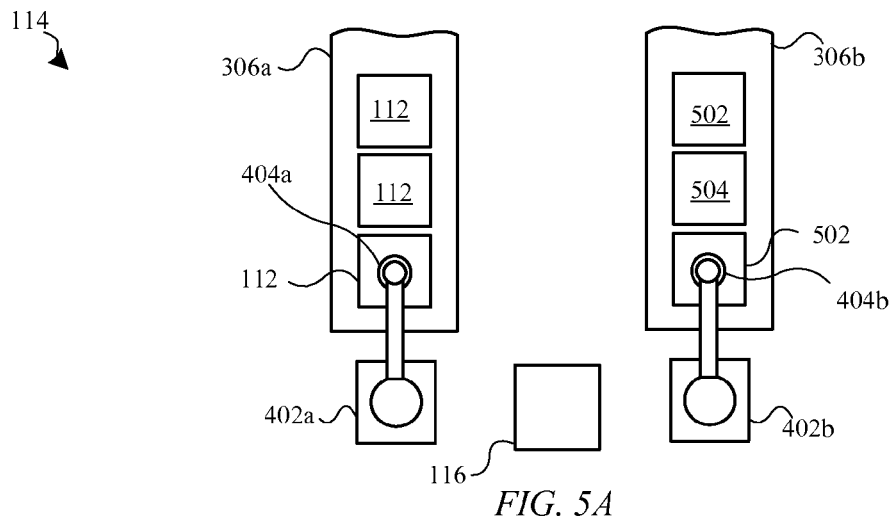
FIGS. 5A-5C show how a number of pick and place operations can be concurrently utilized to fabricate a battery.
Figure 5B:
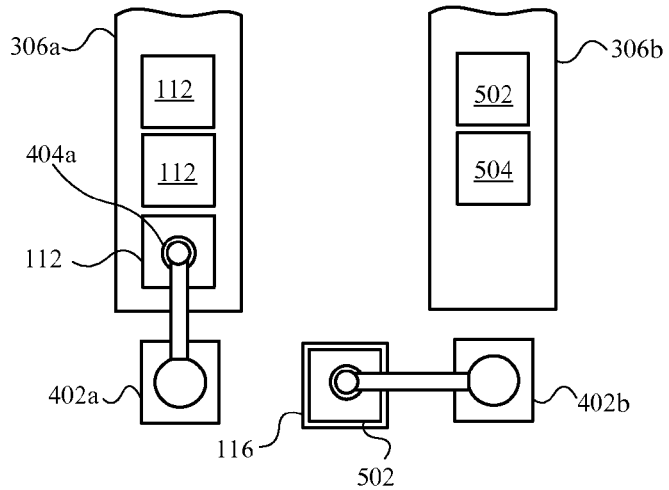
Figure 5C:
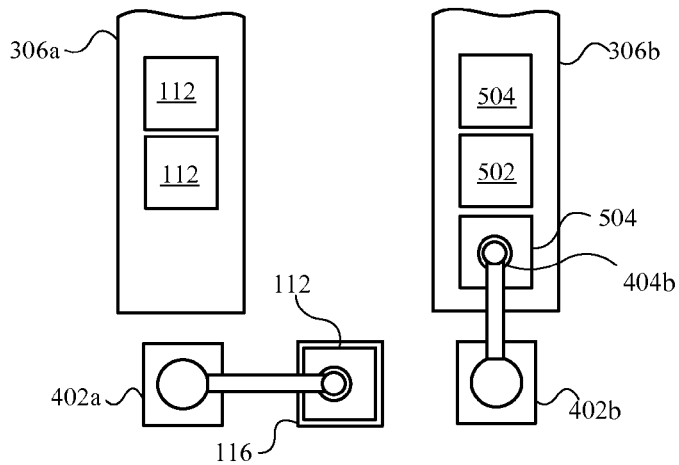

FIGS. 5A-5C show one embodiment in which two pick and place machines 402 can be utilized to conduct pick and place operation 114. FIG. 5A shows how multiple pick and places machines 402 can be configured to each translate one particular type of battery component. For example, in some embodiments, pick and place machine 402a can be utilized to move only separators 112, while pick and place machine 402b can be utilized to move only battery cells 502 and 504. FIGS. 5B and 5C show how pick and place machines 402a and 402b can sequentially assembly battery 116 by distributing separators 112 between battery cells 502 and 504. As depicted in FIG. 5B, pick and place machine 402b first positions battery cell 502 within battery 116. FIG. 5C shows how separator 112 can be subsequently placed atop battery cell 502. FIGS. 5A-5C show how separators 112 and battery cells 502 and 504 can be continuously supplied to pick and place machines 402a and 402b by at least two conveyor belts such that first conveyor belt 306a conveys only separators 112 to first pick-up position 404a, and second conveyor belt 306b conveys only battery cells 502 and 504 to second pick-up position 404b. Furthermore, battery cells 502 and 504 can be arranged on second conveyor belt 306b in an alternative order, as depicted. In some embodiments, a third conveyor belt can work in parallel with conveyor belt 306b. In this way, conveyor belt 306b can convey only positively charged battery cells 504 and the third conveyor belt can supply only negatively charged battery cells 502. In some embodiments, conveyor belts 306a and 306b can be arranged substantially parallel to each other and positioned equidistant from a single pick and place machine 402. In this way, pick and place machine 402 can alternate between translating and placing each component of battery 116. For example, separator 112 can be first placed atop negatively charged battery cell 502, and subsequently positively charged battery cell 504 can be placed atop separator 112 using the single pick and place machine 402. Accordingly, a quality and accuracy of battery 116 can be improved and maintained during battery assembly operation 100 by utilizing pick and place machine 402.

Figure 6A:
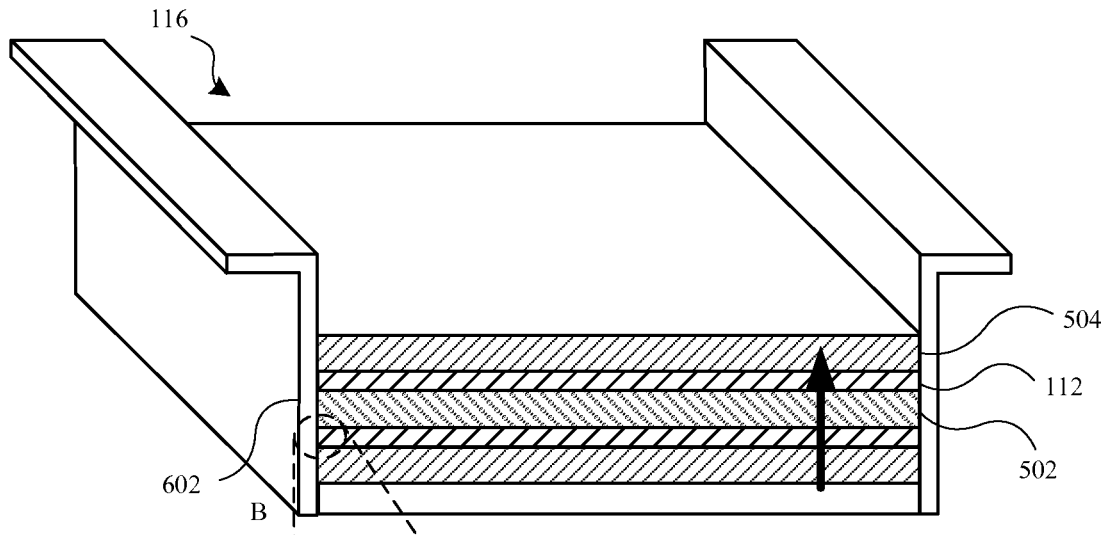
FIG. 6A shows an isometric cross-sectional view of a number of battery cells arranged in a stack.

FIG. 6A shows an isometric cross-sectional view of battery 116 along with a desired ion flow direction during discharge. As shown, battery 116 utilizes negatively charged battery cell 502, separator 112, and positively charged battery cell 504. In some embodiments, a number of battery components can be connected and arranged in a stack to form battery 116. As shown, fixturing device 602 can be utilized to align each individual component placed within battery 116. In some embodiments, this is accomplished by placing at least one vertical support within battery 116. In this way, each individual component can be oriented substantially the same as the previous individual component. For example, separator 112 can be placed atop negatively charged battery cell 502. Fixturing device 602 can then be utilized to align each corresponding edge of separator 112 and negatively charged battery cell 502. By aligning the edges of separator 112 with the edges of the battery components, separator 112 can prevent ionic transfer from bypassing separator 112. Because the ionic flow is forced to pass through separator 112, separator 112 can effectively limit ionic flow through battery 116 to a desired flow direction. Furthermore, in some embodiments, fixturing device 602 can be removed prior to placing battery 116 in the final battery module. In other embodiments, fixturing device 602 can be incorporated into the final battery module.

Figure 6B:
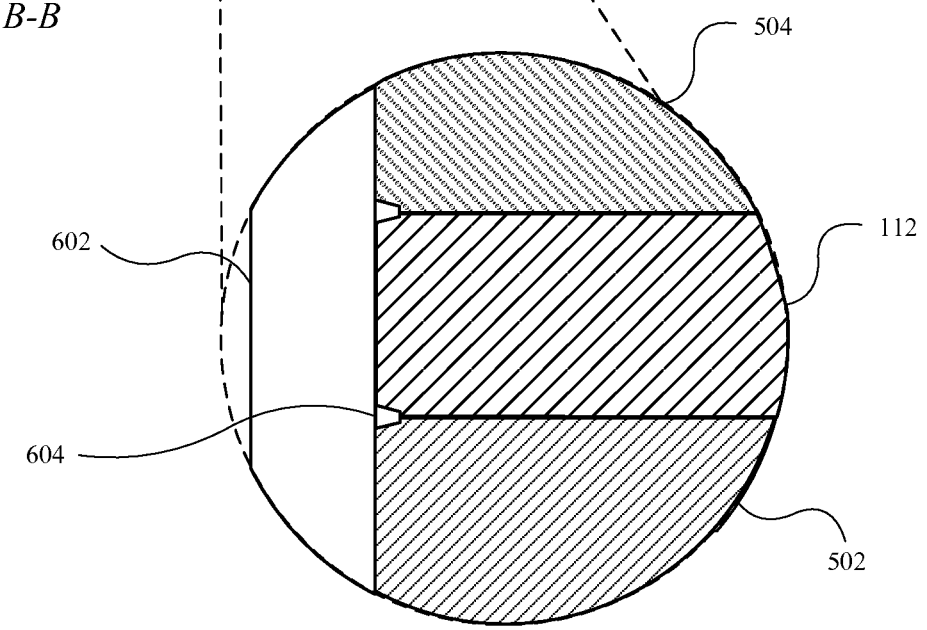
FIG. 6B shows a close up cross-sectional view of how a fixturing device can be utilized to maintain a position of a separator subsequent to the pick and place operation.

FIG. 6B shows a close up cross-sectional view of how fixturing device 602 can utilize clamps 604 to hold each individual component in place once aligned. In this way, each corresponding edge each individual component can be inhibited from shifting during subsequent assembly of battery 116. For example, a polyolefin separator 112 can substantially contract in a linear dimension when cooled below a transition temperature. Consequently, the polyolefin separator 112 can substantially expand in the linear dimension upon returning to a flexible state. In this particular embodiment, clamp 604 can be utilized to fix a portion of the polyolefin separator 112 in the desired location during the temperature change of the polyolefin separator 112. In another embodiment, depending on a material of separator 112, cutting apparatus 110 can undersize separator 112 to account for an amount of thermal contraction/expansion of separator 112, known as a coefficient of thermal expansion. In this way, clamps 604 can be utilized to fix a central portion of separator 112, or the use of clamps 604 can be avoided altogether, and separator 112 can freely enlarge in a linear dimension upon returning to a flexible state, thereby substantially corresponding to a linear dimension of a first battery cell.

Figure 7A:
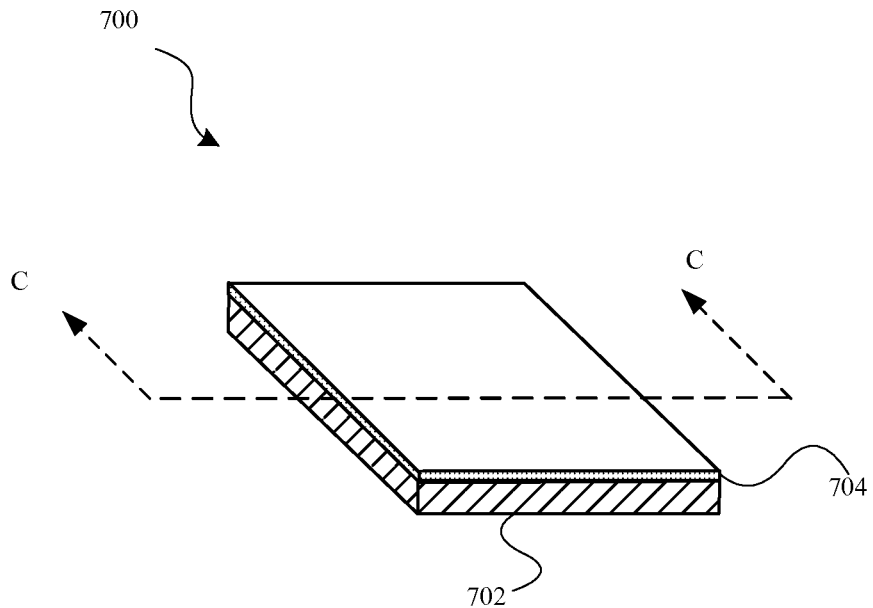
FIGS. 7A-7B show an isometric and a cross-sectional view of the separator including a thin polymeric substrate and ceramic layer.
Figure 7B:
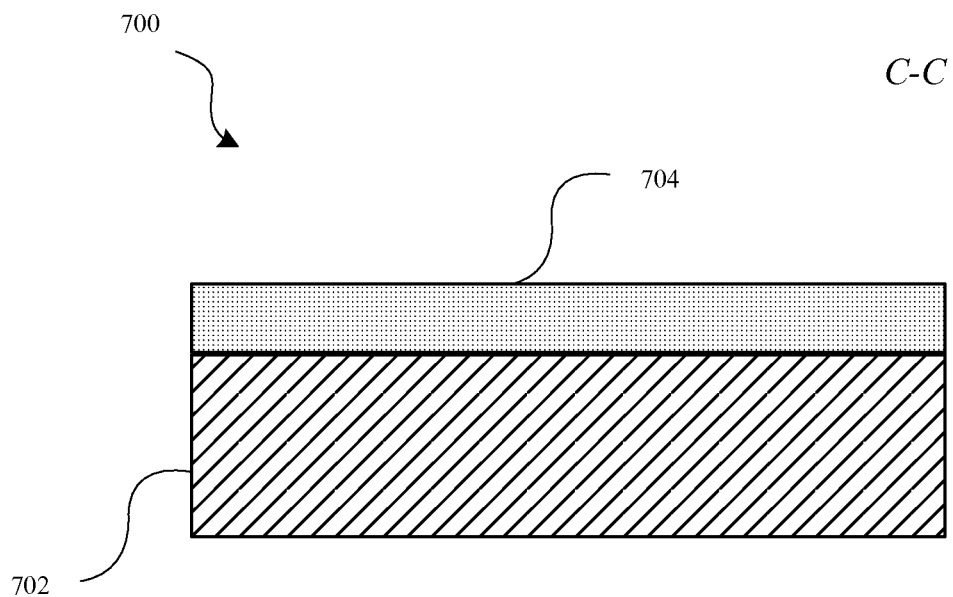

FIGS. 7A-7B show an isometric and a cross-sectional view of separator 700 formed from thin polymeric substrate 702 and ceramic layer 704. Separator 700 can utilize ceramic layer 704 to increase thermal resistance and dimensional stability of thin polymeric substrate 702 during a high temperature battery operation. During operation of battery 116, ceramic layer 704 absorbs substantial amounts of thermal energy, thereby reducing the amount of thermal energy absorbed by monomer chains of thin polymeric substrate 702. Additionally, ceramic layer 704 buttresses thin polymeric substrate 702 by inhibiting material migration and increasing dimensional stability of thin polymeric substrate 702. In this way, battery 116 is less likely to short circuit due to separator 700 shrinking or deforming during high temperature operation of battery 116. For example, a lithium ion battery can operate at a temperature above a melt temperature of a thermoplastic film used as thin polymeric substrate 702 within the lithium ion battery. Ceramic layer 704 can be utilized to increase the thermal resistance of the thermoplastic film, thereby reducing deformation and the ability of lithium ion battery to short-circuit. In some embodiments, a coating apparatus can be incorporated into battery assembly operation 100 to cover thin polymeric substrate 702 with ceramic layer 704.

Figure 8:
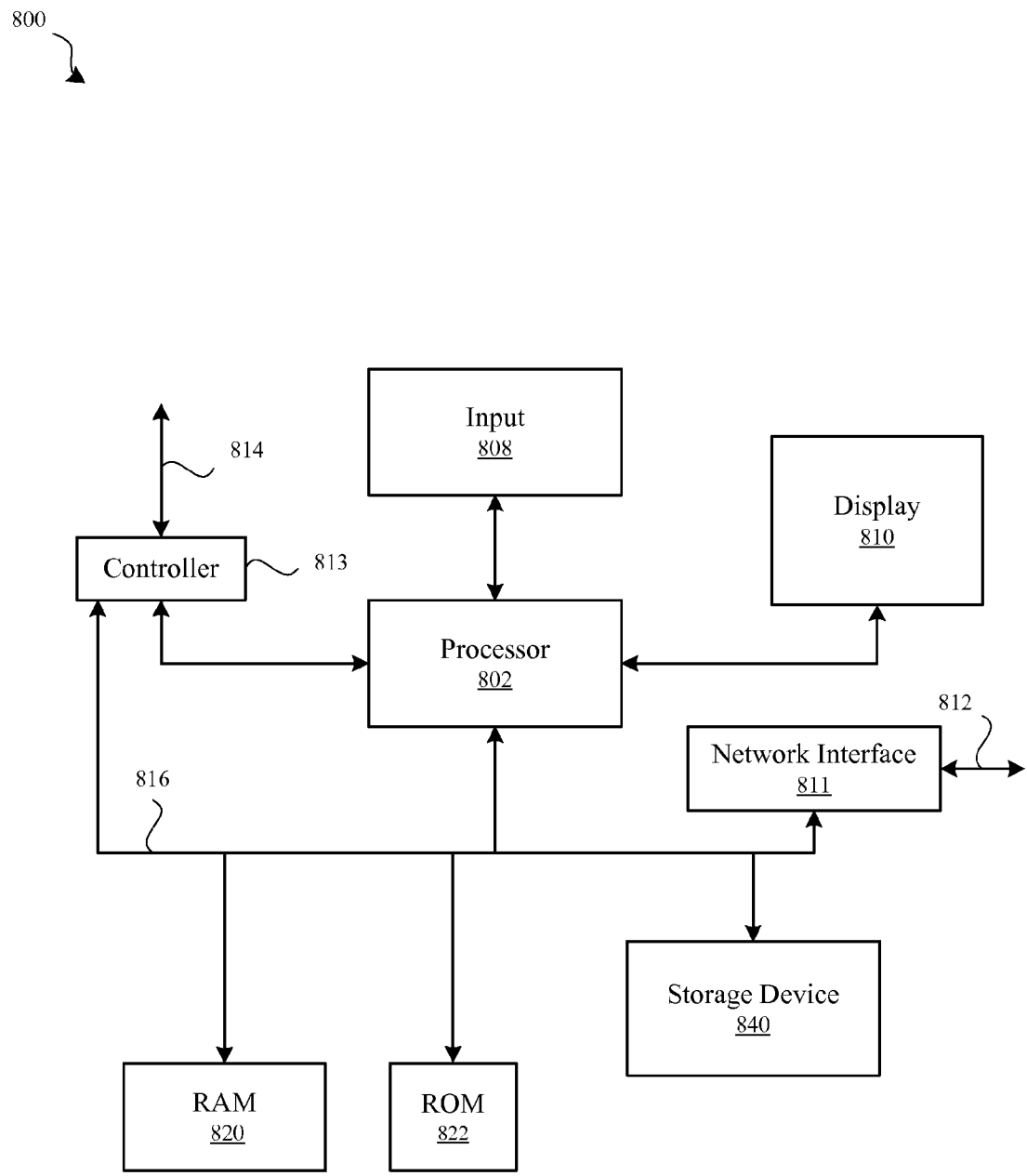
FIG. 8 is a block diagram of an automated machine suitable for use with the described embodiments.

FIG. 8 illustrates a detailed view of automated machine 800 that can be used to implement the various components described herein, according to some embodiments. In particular, the detailed view illustrates various components that can be included in battery assembly operation 100 illustrated in FIG. 1. As shown in FIG. 8, automated machine 800 can include processor 802 that represents a microprocessor or controller for controlling the overall operation of automated machine 800. Automated machine 800 can also include user input device 808 that allows a user of automated machine 800 to interact with automated machine 800. For example, user input device 808 can take a variety of forms, such as a button, keypad, dial, touch screen, audio input interface, visual/image capture input interface, input in the form of sensor data, etc. Still further, automated machine 800 can include display 810 (screen display) that can be controlled by processor 802 to display information to the user. Data bus 816 can facilitate data transfer between at least storage device 840, processor 802, and controller 813. Controller 813 can be used to interface with and control different equipment through and equipment control bus 814. Automated machine 800 can also include network/bus interface 811 that couples to data link 812. In the case of a wireless connection, network/bus interface 811 can include a wireless transceiver.

Automated machine 800 also includes a storage device 840, which can comprise a single disk or a plurality of disks (e.g., hard drives), and includes a storage management module that manages one or more partitions within the storage device 840. In some embodiments, storage device 840 can include flash memory, semiconductor (solid state) memory or the like. Automated machine 800 can also include a Random Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of battery assembly operation 100.

Figure 9:
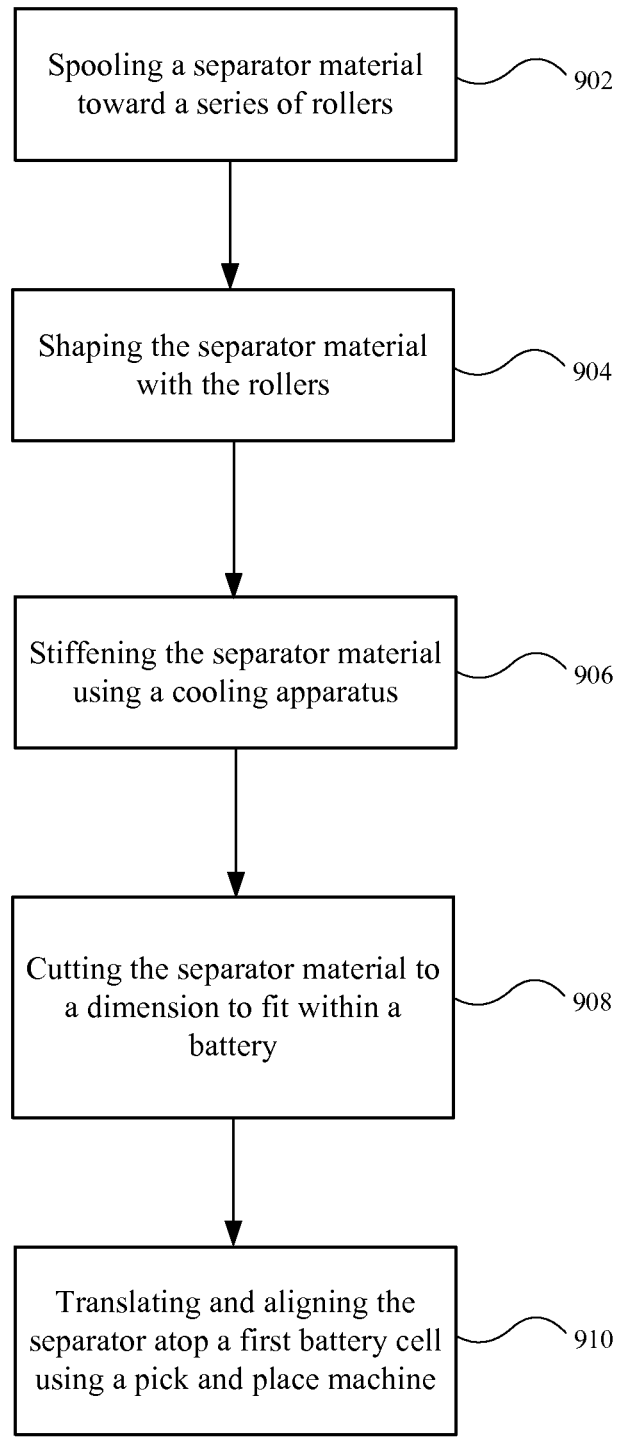
FIG. 9 shows a flow chart representing a method for building a battery utilizing a pick and place machine to translate and align cooled separators within the battery.

FIG. 9 is a flow chart showing process steps involved in a battery assembly operation. At 902, separator material is spooled towards rollers. A first length of the separator material can be fed through the rollers towards a cooling apparatus. Moreover, the rollers can enable a conveyance of the separator material by utilizing a frictional force between the surface of each roller and the surface of the separator material. Additionally, if the frictional force between rollers and the separator material is less than adequate to effectively convey the separator material, and further unwind the spool of separator material, a puller apparatus can be utilized to facilitate the conveyance of the separator material. In this way, a thermoplastic film with a low coefficient of friction on the rollers can still be incorporated into a battery assembly operation by utilizing the puller apparatus. Furthermore, multiple spools of separator material can be configured to simultaneously convey the separator material into the rollers. For example, the spools of separator material spools can be positioned to allow each individual spool of separator material to convey the separator material into the rollers. Consequently, the battery can incorporate multiple types of separators within the battery, such that each separator incorporated has distinct material properties. For example, a first spool can convey a polyethylene film while a second spool can convey a polypropylene film.

At 904, rollers are utilized to flatten and/or shape the separator material into a desired geometry as the separator material is conveyed towards the cooling apparatus. For example, the rollers can be configured to remove any wrinkles or bends in the separator material and then flatten out the separator material during an initial portion of battery assembly operation. Furthermore, the rollers can be configured to maintain a uniform tension on the separator material during an initial portion of battery assembly operation. In this way, the separator material can remain taut, thereby reducing the tendency of the separator material to wrinkle and deform. Moreover, in some embodiments, at least one of the rollers can include a surface texture than can be used to impart a texture onto a surface of the separator material during conveyance of the separator material. In some embodiments, two rollers can be positioned parallel and adjacent to another, such that the two rollers are separated by a gap, the gap being a distance that is substantially smaller than a thickness of the separator material. In this way, the thickness of the separator material will be reduced when fed through the gap during conveyance through the two rollers. Consequently, a separator material having an initial thickness that is greater than a desired thickness can still be incorporated into the battery using the aforementioned thinning process.

At 906, a cooling apparatus is utilized to stiffen the separator material by cooling the separator material below a transition temperature. The transition temperature is a temperature at which the separator material transitions from a flexible state to a rigid state. In some embodiments, the separator material transitions to the rigid state as a result of the cooling process because of an inability of a first group of monomers to shift past a second group of monomers within the separator material. Consequently, a first portion and a second portion of the separator can remain substantially within the same plane while the separator is being handled. Moreover, the cooling apparatus can utilize a cooling agent that is capable of cooling the separator material below a threshold temperature. The threshold temperature is substantially lower than the transition temperature so that the separator material can undergo a substantial temperature increase without exceeding the transition temperature and returning to a flexible state. In this way, the separator material can remain below the transition temperature for a period of time, known as the fabrication time. The fabrication time should be greater than an amount of time required for operations which depend upon the increased rigidity of the separator material to be successfully carried out. The cooling apparatus can take many forms, such as a cooling bath filled with dry ice or a cooling spray utilizing liquid nitrogen. Moreover, a cooling period (the amount of time it takes to cool the separator material below the threshold temperature) of the separator material within the cooling apparatus may be reduced by utilizing various cooling apparatus configuration. For example, when a cooling bath is filled with a cooling agent that takes the form of liquid nitrogen, the separator material can be cooled below the threshold temperature upon or shortly after contacting the liquid nitrogen. In this way, the cooling bath filled with liquid nitrogen facilitates a shorter cooling period, and consequently a substantially faster feed rate of the separator material through the cooling apparatus. In contrast, when the cooling agent takes the form of dry ice a substantially longer cooling period can be required. Consequently, dry ice may require a substantially slower feed rate, which may adversely affect the ability of subsequent operations to carry out a given operation before the fabrication time period expires.

In some embodiments, a cooling roller can be positioned after the cooling apparatus to help maintain a temperature of the separator material below the transition temperature for a longer period of time. In this way, a length of time spent by the separator material in the cooling apparatus can be reduced. Alternatively, the cooling roller can effectively increase the fabrication time. A conveyor belt can also utilize a cooled section to mitigate warming of a separator during the remainder of the battery assembly operation. In this way, a pick and place machine can have a substantially higher probability of carrying out the pick and place operation while the separator is in a rigid state.

At step 908, the separator material is cut to a desired dimension to substantially correspond to the dimensions of the battery utilizing a cutting apparatus. The cutting apparatus can take many forms, for example, the cutting apparatus can utilize a single edge cutter. In other embodiments, the cutting apparatus can utilize a blade cutter that translates from a first location to a second location across the width of the separator material resulting in a straight line cut. In some embodiments, the cutting apparatus can utilize a stamping apparatus that can be utilized to cut the separator into non-rectangular geometries. Moreover, the stamping apparatus can be utilized to cut the separator material into multiple separators during each cutting cycle. In some embodiments, the multiple separators that result can be different in size and shape, and consequently each individual separator can be used in different battery assemblies. Furthermore, an optical sensor can be positioned following the cutting apparatus and can be utilized to track the dimensional accuracy of a separator cut by the cutting apparatus. In this way, the separator which is cut to an incorrect dimension can be removed from the battery assembly operation. The optical sensor can also be utilized to communicate a position of the separator to a computer actuated arm prior to translating the separator.

At 910, a pick and place machine is utilized to first translate and subsequently align a separator atop a battery cell. In some embodiments, the pick and place machine can translate and align the separator atop the battery cell using a coupling mechanism such as a suction head as discussed above. In addition, the pick and place machine can utilize a thermal sensor located on the suction head. In this way, the thermal sensor can measure a temperature of the separator and consequently determine whether separator 112 remains below the transition temperature. Moreover, if the thermal sensor measures a separator above the transition temperature, the pick and place machine can discard the separator or send the separator back for additional cooling or reincorporation into a roll of separator material. Accordingly, a quality and accuracy of a battery can be improved and maintained during a pick and place operation by utilizing the thermal sensor attached to a pick and place head.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method of assembling a battery, the method comprising:

cooling a thermoplastic film below a temperature at which a stiffness of the thermoplastic film inhibits a first portion of the thermoplastic film from deforming with respect to a second portion of the thermoplastic film for a predetermined period of time;

cutting the thermoplastic film to a set of dimensions for forming a separator which corresponds to a set of dimensions of the battery; and translating the thermoplastic film, via a pick and place operation, from a first position to a second position, wherein the cutting, and translating of the thermoplastic film are completed during the predetermined period of time.

2. The method as recited in claim 1, wherein the first portion is a central portion of the thermoplastic film and the second portion is a peripheral portion of the thermoplastic film.

3. The method as recited in claim 1, wherein cooling the thermoplastic film below the temperature comprises cooling the thermoplastic film such that a first group of monomers of the thermoplastic film is inhibited from shifting past a second group of monomers of the thermoplastic film.

4. The method as recited in claim 1, wherein translating the thermoplastic film comprises coupling the thermoplastic film to a computer actuated arm.

5. The method as recited in claim 1, wherein translating the thermoplastic film comprises translating the thermoplastic film from the first position to a location above a battery cell corresponding to the second position; and placing the thermoplastic film atop the battery cell, wherein the cutting, translating, and placing are completed during the predetermined period of time.

6. The method as recited in claim 5, wherein cutting the thermoplastic film to the set of dimensions comprises cutting the thermoplastic film to have a shape and size in accordance with a top surface of the battery cell.

7. The method as recited in claim 5, wherein translating the thermoplastic film atop the battery cell comprises aligning an edge of the thermoplastic film with a corresponding edge of the battery cell.

8. The method as recited in claim 1, wherein cooling the thermoplastic film comprises cooling the thermoplastic film using a cooling bath or a cooling spray.

9. The method as recited in claim 8, wherein cooling the thermoplastic film comprises directing the cooling bath or the cooling spray at a top surface and bottom surface of the thermoplastic film.

10. The method as recited in claim 8, wherein the cooling spray comprises a plurality of spray patterns.

11. The method as recited in claim 5, wherein the thermoplastic film comprises a ceramic layer that increases dimensional stability of the thermoplastic film during operation of the battery cell.

12. The method as recited in claim 11, wherein the ceramic layer increases the thermoresistance of the thermoplastic film by inhibiting a tendency of the thermoplastic film to deform.

13. The method as recited in claim 1, further comprising flattening the thermoplastic film using a series of rollers.

14. The method as recited in claim 13, wherein the series of rollers rotate at a uniform coordinated speed to maintain uniform tension in the thermoplastic film.

15. The method as recited in claim 13, wherein the series of rollers include non-planar geometry for fashioning the thermoplastic film into a non-planar shape.

16. The method as recited in claim 1, wherein cutting the thermoplastic film comprises cutting the thermoplastic film to an initial set of dimensions which are smaller than a final set of dimensions of the thermoplastic film.

17. The method as recited in claim 16, wherein the initial set of dimensions accounts for a coefficient of thermal expansion of the thermoplastic film, such that the thermoplastic film achieves the final set of dimensions upon returning to a flexible state.

18. The method as recited in claim 1, further comprising optically tracking the dimensional accuracy of the separator after the step of cutting and before the step of translating the thermoplastic film.

19. The method as recited in claim 1, wherein cooling the thermoplastic film comprises submerging the thermoplastic film in a cooling bath until the thermoplastic film is cooled below a threshold temperature.

20. The method as recited in claim 19, wherein the threshold temperature is a temperature that is below a transition temperature that results in the thermoplastic film remaining below the transition temperature.

* * * * *